United States Patent [19]

Hitch

[11] Patent Number: 4,703,746

[45] Date of Patent: Nov. 3, 1987

[54] ADJUSTABLE SHUTTER GRATE FOR BARBECUE GRILLS

[75] Inventor: Robert J. Hitch, Columbus, Ga.

[73] Assignee: W. C. Bradley Company, Columbus, Ga.

[21] Appl. No.: 893,222

[22] Filed: Aug. 5, 1986

[51] Int. Cl.⁴ ............................................. A47J 37/00
[52] U.S. Cl. ................................... 126/25 R; 126/153; 99/450
[58] Field of Search .................. 126/25 R, 25 A, 9 R, 126/39 K, 9 A, 41 R, 38, 40, 39 E, 153, 30, 29, 160, 152 R; 99/447, 444, 401, 446, 448, 445, 450

[56] References Cited

U.S. PATENT DOCUMENTS

| | | | |
|---|---|---|---|
| 1,956,387 | 4/1934 | Hartman | 99/446 |
| 3,288,050 | 11/1966 | Saiki | 126/25 R |
| 3,323,508 | 6/1967 | Holman | 126/25 R |
| 3,443,510 | 5/1969 | Norton | 99/446 |
| 3,812,840 | 5/1974 | Whalen | 126/25 R |

FOREIGN PATENT DOCUMENTS 2156201 10/1985 United Kingdom .................. 99/446

*Primary Examiner*—James C. Yeung
*Attorney, Agent, or Firm*—Newton, Hopkins & Ormsby

[57] ABSTRACT

An adjustable shutter grate for barbecue grills is disclosed having a lower grate member and an upper grate member. The grate members have generally identical patterns of slots formed therethrough with generally identical patterns of bars delimiting the slots. The upper grate is slidable with respect to the lower grate such that the slots may be in complete registry to allow full heat transmission therethrough or the bars of the upper grate may be disposed to overlie the slots of the lower grate, thereby preventing flare-ups in the fire box from burning the food being cooked or to extend cooking time.

20 Claims, 4 Drawing Figures

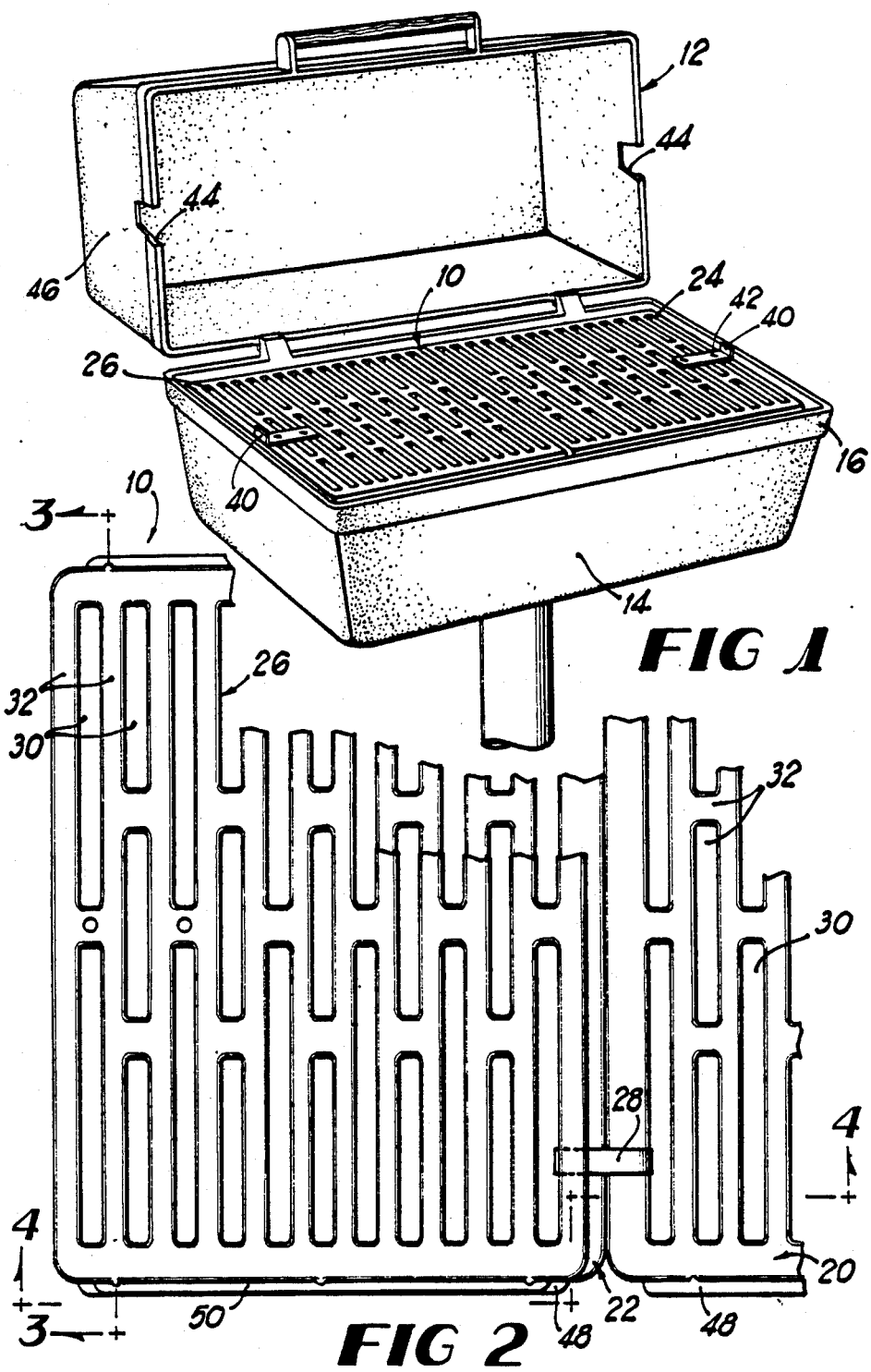

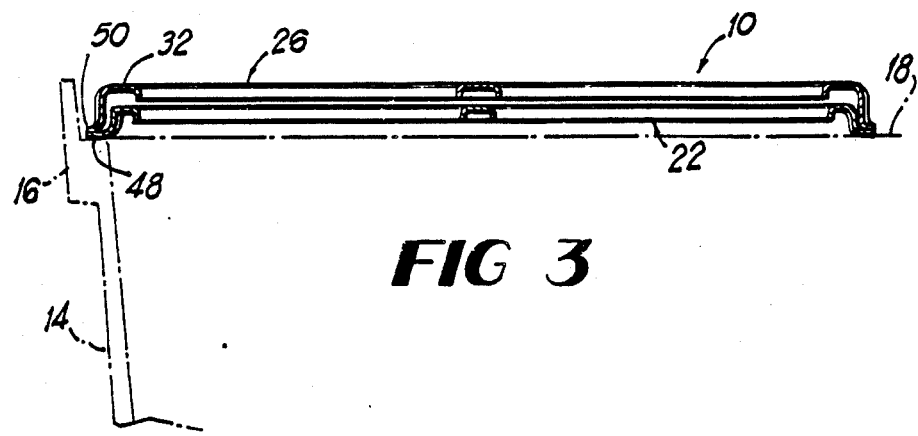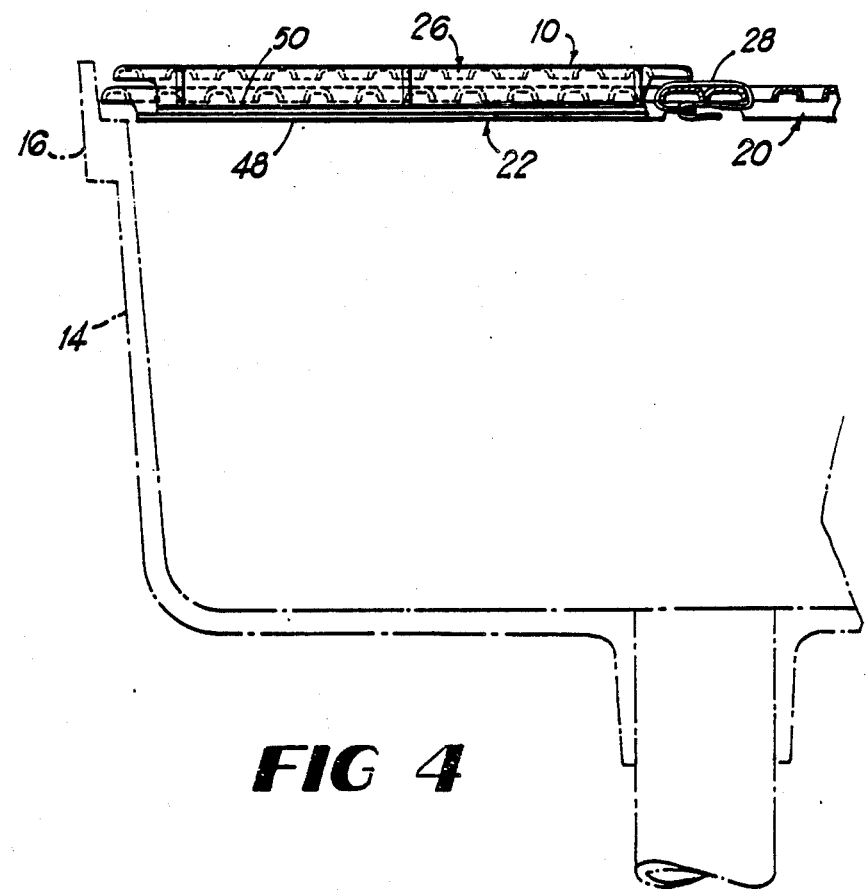

ADJUSTABLE SHUTTER GRATE FOR BARBECUE GRILLS

BACKGROUND OF THE INVENTION

Barbecue grills normally employ a metal cooking grid or grate disposed above a layer of burning charcoal or lava-type rocks heated by a gas or electric burner. The disposition of essentially an open flame beneath food from which flammable grease is dripping makes such grills prone to flare-ups as the grease is ignited. Thus, while grilling provides many advantages, in general, constant supervision is required to avoid burning the food.

Controlling flare-ups is a relatively difficult task, the control methods generally consisting of moving the food to a different place on the grate or pouring or squirting water on the flaming coals. Neither method is satisfactory as the flames may envelop the entire grate, precluding moving the food around, while spraying the coals reduces cooking temperatures and, with charcoal, releases ash particles. In addition, either of the above procedures are merely momentary expedients as ignition of the grease reoccurs rapidly.

The known prior art comprises the following: In U.S. Pat. No. 2,028,649 to Conroy, a broiler is disclosed for draining grease away from food. The pan has two basic embodiments, one having pivoted tongues which tilt to drain grease to the underlying broiler pan, and the other having a stationary grid which receives a movable grid in nesting relationship. The movable grid may be raised by way of camming surfaces to a position above the stationary grid, thereby allowing grease to drain into the underlying pan.

In U.S. Pat. No. 3,288,050 to Saiki, an adjustable grill is disclosed having upper and lower grids with a connecting means securing the grids for relative movement therebetween. The grids have raised center portions and slope toward the periphery thereof, and are provided with grooves and drain holes to carry grease to the periphery.

SUMMARY OF THE INVENTION

It is therefore, one of the principal objects of the present invention to facilitate the cooking of food on a barbecue grill with an adjustable shutter grate for controlling flare-ups and diverting the flames away from the food being cooked.

Another object of the present invention is to provide an adjustable shutter grate that is easily moved between fully open and fully closed positions and which is easily removed for transporting the food from the grill to the serving table or for cleaning.

A further object of the invention is to provide an adjustable shutter grate that can be used with diverse types of grills and is durable for providing a long service life.

These and additional objects are attained by the present invention which relates to an adjustable shutter grate for barbecue grills which is selectively adjustable between fully open and fully closed positions in addition to various intermediate positions. The present grate is normally provided with separable upper and lower grate members, the upper member being slidably adjustable with respect to the lower member. Each member is provided with a plurality of slot means formed therethrough, the members having generally identical patterns so as to register with one another in the fully closed position and prevent the flame below the grate from burning the food being cooked or to extend cooking time. Means are provided for moving the upper members through the various adjusted positions and additional means provide a ready and easily seen indication of the degree of opening.

The present grate may be installed on a plurality of diverse types of barbecue grills from various manufacturers and may also be used to replace older or worn conventional grate structures. Cooking performance is enhanced due to a more even heat distribution than is possible with conventional wire grates and flame control is easily accomplished.

Various additional objects and advantages of the present invention will become apparent from the below description, with reference to the accompanying drawings.

BRIEF DESCRIPTION OF THE DRAWINGS

FIG. 1 is a perspective view of a barbecue grill with the present adjustable shutter grate installed therein;

FIG. 2 is a partial, top plan view of the present shutter grate, the grate on the left as viewed, being in a fully open position;

FIG. 3 is a cross sectional view of the present grate, the section being taken on line 3—3 of FIG. 2; and FIG. 4 is a cross sectional view of the present grate with the upper grate being shown in an adjusted, intermediate position for purposes of illustration, the section being taken generally on line 4—4 of FIG. 2.

DETAILED DESCRIPTION OF THE PREFERRED EMBODIMENT

Referring now more specifically to the drawings and to FIG. 1 and particular, numeral 10 designates generally the adjustable shutter grate of the present invention, the grate being shown installed in a conventional barbecue grill 12. The grate is shown as generally rectangular in shape; however, this configuration may be varied to register with various types of barbecue grills, the rectangular configuration shown not being meant to limit the invention in any way.

Most barbecue grills of this generally rectangular shape are provided with a fire box which contains the burner element and/or the coals or rocks. Disposed at a level above the burner element and/or coals is a support means upon which the cooking grid or grate rests. For illustration, the barbecue grill shown here provides such a support means by the upper rim of the fire box being stepped out as indicated by numeral 16. This provides a ledge 18 formed around the inner periphery of the grill and above the burner element/coals, upon which a grate for holding and cooking food may be installed. The support means may also, for example, be formed as a plurality of embossments which need not be continuous, for example, as tabs provided on the sides of the barbecue grill walls. Thus, the present shutter grate is designed for installation on most types of barbecue grills, the only variance being in the dimension of the grate itself to rest on the support means of the fire box. Similarly, the grate structure shown may be provided with a single upper grate and lower grate, or expanded to three or more sectional structures, for example, on a relatively longer grill used for cooking large amounts of food.

The present grate will normally be constructed from cast iron or a similar suitable material and may be provided with a procelainized finish. As shown in FIG. 2, the grate includes four (4) elements or members. Right and left lower grate members 20 and 22, respectively, are provided and rest on the support means or ledge 18. Disposed above the lower grates are right and left upper grate members 24 and 26, respectively. As will be further explained hereinbelow, the upper grates are slidable with respect to the lower grates in order to provide a shutter effect against the underlying heat source. In addition, when in their installed positions, the upper surfaces of the lower grate members and the upper grate members respectively, lie in a common plane.

FIG. 2 illustrates a portion of the grate surface. The lower grate sections 20 and 22, resting on the grate supporting means, may be held together to prevent relative movement therebetween with a suitable clamping means such as band 28. The band serves to prevent movement of the lower grate as the upper grate is moved to expose or cover the slot means 30. This effectively provides a unitary lower grate unit, which may be separated for transport or cleaning. As the plan view illustrates, slot means 30 are provided in both upper and lower grates, the slots being staggered in the individual grate units to provide uniform heat distribution. Identical patterns of slots are formed in the upper and lower grate members, as shown by the full open position on the left side of FIG. 2 as viewed in the drawings. Disposed between each row of slots are generally continuous bar means 32, which are designed to be selectively transposed with the slots in the underlying or overlying grate. As such, the slot means and bar means are substantially of identical width, also. Thus, the grate may have full open, full closed, or any of a number of intermediate positions therebetween.

In the fully open positions, the slot means of the upper and lower grate members are aligned or in full registry. In the fully closed positions, the slot means of the lower grate members are covered by the bar means formed between the slot means of the upper grate members. Similarly, the slot means of the upper grate members are blocked by the bar means of the lower grate members. The intermediate positions may, of course, vary between the two extremes.

The upper grate member or members will normally be moved with respect to the lower member using an elongated tool (not shown) which is designed to push or pull the upper grate member. A tool designed for this purpose may have an elongated rod with a member secured to the end thereof, the member having projections to engage the grate member. Other types of tools, such as spatulas or forks may also be used. As an alternative, a handle means 40, as shown in FIG. 1, may be fastened to the grate with a suitable means such as rivets 42. The handles are generally L-shaped with a short vertical projection. These handles may be used to move the upper grate relative to the lower grate, the movement being accomplished by tapping the handle with a fork or spatula or with a suitable protective mitt, by hand. Thus, each side of the grate surface may be adjusted independently of the other for maximum flexibility in varying cooking rates.

The handles may be in the general vicinity of the cut-out portions 44 in the grill top or lid 46, or they can be mounted, for example, near the front edge of the grate. If a rotisserie unit is not mounted, the tool, fork or similar device may be used to move the upper grate through the cut-out portion 44, enabling adjustment of the grates without necessitating lifting of the top 46. This becomes especially convenient where the grill top or lid is provided with a viewing window (not shown), through which flare-ups are easily seen. In addition, to facilitate the determination as to the degree of openness of the slots 30, the upper and lower grate members are each provided with a different colored, porcelainized finish. Thus, a further visual indication is provided which shows the relative positioning of the upper grate members with respect to the lower grate members.

FIGS. 3 and 4 illustrate the configuration of the grate bars 32, and FIG. 4 shows an intermediate, adjusted position of the upper grate relative to the lower grate. Each bar 32 has a generally inverted convex outer surface configuration, with the uppermost portion being generally flattened in order to provide a uniform and level cooking surface. This configuration provides several distinct advantages. The convex shape cannot collect grease, which runs off the bars and into the fire box 14, and the arcuate shape of the inner surface of the bars tends to divert the flames from flare-ups during cooking back toward the bed of coals or burner element.

The grates are designed to provide maximum heat transmission, being dimensioned such that the outer edges of the grate are fully supported on the grate supporting means of the barbecue grill, and cannot be moved to any position where the edges are disengaged from the support. Thus, the grates cannot fall into the fire box while a maximum amount of surface area is available for heat transmission through the lower grate and maximum surface area is available for cooking on the upper grate. The lateral sliding movement of each upper grate member is limited by the other, or a tab means (not shown) may be provided on the lower grate members which cooperates with a limiting or stop means (not shown) on the upper grate members.

In FIG. 3, edge means 48 of the lower grate is shown resting on the support means or ledge 18. The outer edge portion 50 of the upper grate rests and travels on this edge 48, in order to slightly elevate the upper grate over the lower grate and to facilitate the sliding movement which characterizes the present invention. The degree of separation thus provided insures that the upper grates will be freely slidable on the lower grates and that there will be no possibility of grease or particle build-up which could hinder movement, as is possible with prior art designs.

The present grate thus allows the grease and other liquids from food being cooked on the grate to drain downwardly onto the burning coals. This is the desired effect as this process adds much flavor to the foods being cooked, and is one of the reasons for grilling food in this manner. If the grease should ignite upon contact with the bed of coals, the flare-up can be easily kept from burning the food through the operation of the present shutter grate system. This is in direct contrast to attempts made in the prior art to provide a type of shutter system, the prior art grills being designed to drain grease away from the bed of coals. Thus, prior art designs normally require a grease receptacle which must be periodically cleaned or require that the grease be scraped from the grill and from between the upper and lower grill members in order to insure their proper operation. The present invention avoids these disadvantages by moving in an opposite direction from prior art attempts to provide for flame control.

In the use and operation of the present shutter grate system, the lower grates 20 and 22 are placed on a suitable support above the heating elements. A fastening means such as band 28 may then be employed to secure the lower grates together. The upper grate members 24 and 26 are then laid over the lower grates, with handles 40 being disposed at the far left and right edges. The upper grates are thus laterally movable and slide on the lower grates. The upper and lower grates are provided with identical slot patterns such that the grates may be disposed in full open, full closed, or any of the intermediate positions therebetween to allow heat transmission therethrough for the grilling of food on the grates, or to prevent flames or flare-ups in the fire box from reaching the food being cooked.

While an embodiment of a shutter grate system has been shown and described in detail herein, various changes and modifications may be made without departing from the scope of the present invention.

I claim:

1. An adjustable shutter grate for a barbecue grill having a firebox and a heat source disposed therein comprising a lower grate member having edge means for resting on a support means formed above said heat source, an upper grate member disposed above said lower grate member and having edge portions resting on said lower grate member for raising said upper grate member relative to said lower grate member and for facilitating relative sliding movement therebetween, said upper and lower grate members having a generally identical pattern of slot means formed therethrough and a generally identical pattern of bar means disposed therebetween, said bar means designed to overlie said slot means upon sliding movement of said upper grate said bar means being convex for allowing drippings from the food being cooked thereon to drain into the firebox and for directing flames from said heat source downwardly therefrom.

2. A shutter grate as defined in claim 1 in which said grate includes at least two lower grate members lying generally in a common plane and at least two upper grate members disposed above said lower members and being disposed in side by side relationship.

3. A shutter grate as defined in claim 2 in which said upper grate members include handle means for moving said upper members laterally.

4. A shutter grate as defined in claim 1 in which said upper grate member includes handle means for moving said upper member.

5. A shutter grate as defined in claim 1 in which said upper grate member has edge portions depending therefrom which rest on said edge means of said lower member to facilitate sliding movement thereon.

6. A shutter grate as defined in claim 5 in which said slot means and said bar means are substantially identical in width.

7. A shutter grate as defined in claim 1 in which said slot means and said bar means are substantially identical in width.

8. A shutter grate as defined in claim 7 in which said bar means have a generally flattened upper surface for supporting food being cooked thereon.

9. An adjustable shutter grate for a barbecue grill, said grill having a fire box with a heat source disposed therein and a grate holding means formed thereon, said grate comprising upper and lower grate members, each having a generally identical pattern of slot means formed therein and a generally identical pattern of bar means disposed therebetween said bar means being convex for allowing drippings from the food being cooked thereon to drain into the firebox and for directing flame from the heat source downwardly therefrom, said upper grate member being movable with respect to said lower grate member in a direction so as to selectively align said slot means and said bar means of said respective grate member to positions ranging from full registry to non-registry, said lower grate member having edge means designed to rest on the grate holding means, and said upper grate member having edge portions depending downwardly therefrom and designed to cooperate with said lower edge means for elevating said upper grate member with respect to said lower grate member and for facilitating axial sliding movement of said upper grate member with respect to said lower grate member, and restricting sliding movement of said upper grate member in a radial direction.

10. A shutter grate as defined in claim 9 in which said grate includes at least two lower grate members and at least two upper grate members disposed above said lower members and being disposed in side by side relationship.

11. A shutter grate as defined in claim 10 in which said upper grate members include handle means for moving said upper members laterally.

12. A shutter grate as defined in claim 9 in which said upper grate member includes handle means for moving said upper member.

13. A shutter grate as defined in claim 12 in which said slot means and said bar means are substantially identical in width.

14. A shutter grate as defined in claim 9 in which said slot means and said bar means are substantially identical in width.

15. An adjustable shutter grate for barbecue grills, said grill having a fire box with a heat source disposed therein and a projection means disposed above said heat source for supporting a cooking surface, said shutter grate comprising upper and lower grate members, each having a generally identical pattern of slot means formed therein with a generally identical pattern of bar means disposed between said slot means, said upper grate being axially movable with respect to said lower grate in a direction so as to selectively tranpose said slot means and said bar means of said respective grate members in overlying relationship, said lower grate member having edge means depending therefrom and designed to rest on said projection means of the barbecue grill formed above the heating source and said upper grate member having edge portions depending downwardly therefrom and cooperating with said edge means for maintaining said upper grate member in a raised position over said lower grate member and for facilitating sliding movement of said upper grate member with respect to said lower grate member, said bar means being convex for directing flames from said heat source downwardly and for causing drippings from the food being cooked thereon to drain into said fire box.

16. A shutter grate as defined in claim 15 in which said shutter grate includes at least two lower grate members lying in a common plane and having means securing said lower members together and at least two upper grate members disposed above said lower members and lying in side by side relationship.

17. A shutter grate as defined in claim 16 in which said upper grate members include handle means for moving said upper members laterally.

18. A shutter grate as defined in claim 15 in which upper grate member includes handle means for moving said upper member.

19. A shutter grate as defined in claim 18 in which said slot means and said bar means are substantially identical in width.

20. A shutter grate as defined in claim 15 in which said slot means and said bar means are substantially identical in width.

* * * * *